United States Patent
Wu et al.

(10) Patent No.: US 7,865,032 B2
(45) Date of Patent: Jan. 4, 2011

(54) METHODS AND SYSTEMS FOR IDENTIFYING AN ILL-EXPOSED IMAGE

(75) Inventors: Peng Wu, San Jose, CA (US); Suk Hwan Lim, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1109 days.

(21) Appl. No.: 11/534,622

(22) Filed: Sep. 22, 2006

(65) Prior Publication Data

US 2008/0075383 A1 Mar. 27, 2008

(51) Int. Cl.
*G06K 9/00* (2006.01)
*G06K 9/40* (2006.01)
(52) U.S. Cl. .................. 382/274; 382/100; 382/275
(58) Field of Classification Search .......... 382/117, 382/100, 274–275
See application file for complete search history.

(56) References Cited

U.S. PATENT DOCUMENTS

| | | | |
|---|---|---|---|
| 5,724,456 A * | 3/1998 | Boyack et al. ............. | 382/274 |
| 5,739,922 A * | 4/1998 | Matama ..................... | 358/447 |
| 6,259,537 B1 * | 7/2001 | Matama ..................... | 358/1.9 |
| 6,353,674 B1 * | 3/2002 | Dewaele .................... | 382/132 |
| 6,415,053 B1 * | 7/2002 | Norimatsu ................. | 382/199 |
| 6,480,300 B1 * | 11/2002 | Aoyama ..................... | 358/1.9 |
| 6,611,608 B1 * | 8/2003 | Wu et al. .................... | 382/100 |
| 6,931,161 B2 | 8/2005 | Gallagher | |
| 7,079,702 B2 | 7/2006 | Watanabe et al. | |
| 7,102,697 B2 | 9/2006 | Lei et al. | |
| 7,283,666 B2 * | 10/2007 | Saquib et al. .............. | 382/167 |
| 7,327,891 B2 * | 2/2008 | Covell et al. ............... | 382/224 |
| 2004/0052414 A1 | 3/2004 | Schroder | |
| 2004/0091169 A1 | 5/2004 | Park et al. | |
| 2004/0120599 A1 * | 6/2004 | Henley ....................... | 382/274 |
| 2004/0170316 A1 * | 9/2004 | Saquib et al. .............. | 382/162 |
| 2004/0184673 A1 * | 9/2004 | Watanabe ................... | 382/274 |
| 2004/0190789 A1 * | 9/2004 | Liu et al. .................... | 382/274 |
| 2004/0208393 A1 * | 10/2004 | Nakakuki ................... | 382/274 |
| 2005/0249409 A1 | 11/2005 | Kang | |
| 2006/0088210 A1 * | 4/2006 | Yu et al. ..................... | 382/167 |
| 2006/0204056 A1 * | 9/2006 | Steinberg et al. .......... | 382/118 |
| 2006/0204124 A1 * | 9/2006 | Aihara ........................ | 382/274 |
| 2006/0285740 A1 * | 12/2006 | Okita ......................... | 382/151 |
| 2010/0054592 A1 * | 3/2010 | Nanu et al. ................ | 382/167 |

FOREIGN PATENT DOCUMENTS

EP 0767399 4/1997

OTHER PUBLICATIONS

Suk Hwan Lim et al "Detection of Out-of-Focus Digital Photographs" HP Laboratories Technical Report HPL-2005-14, Jan. 20, 2005.

Benke K K et al: "A study of the effect of image quality on texture energy measures" Measurement Science & TecH., Institute of Physics Pub., Bristol, GB col. 5, No. 4, Apr. 1, 1994.

* cited by examiner

*Primary Examiner*—Wenpeng Chen
*Assistant Examiner*—Gandhi Thirugnanam

(57) ABSTRACT

The present invention provides methods, systems and a machine readable medium including machine readable code for identifying an ill-exposed image. An image including a first image block is received. The luminance data and the texture energy data associated with the first image block are assessed. A determination is made regarding whether the received image is an ill-exposed image based on the assessment of the luminance data and the assessment of the texture energy data associated with the first image block.

16 Claims, 6 Drawing Sheets

METHODS AND SYSTEMS FOR IDENTIFYING AN ILL-EXPOSED IMAGE

FIELD OF THE INVENTION

The present invention generally relates to image processing and more particularly to methods and systems for identifying ill-exposed images.

BACKGROUND OF THE INVENTION

Advances in digital photography technology have led to an increase in the number of photographs being taken and stored in a digital format. In many instances, photographs taken with analog cameras are being processed and stored on digital storage media. Pictures are routinely scanned for storage as digital images. Many handheld devices, such as for example, personal digital assistants and cellular telephones, include cameras for capturing and storing digital photographs. Photographs are often shared via online digital photo albums. A user often has to sort through large numbers of digital photographs to select photographs for archiving and/or printing. In many cases, the decision to archive and/or print a photograph depends on the quality of the photograph. Users routinely discard photographs that are ill-exposed, in other words, images that are overexposed, underexposed or a combination of both where the image is overexposed in some sections and underexposed in other sections.

Many prior art devices determine whether a photograph or an image is ill-exposed based on an analysis of a luminance histogram of the distribution of the luminance level of the pixels in the digital image. One of more luminance parameters, such as for example, the average luminance of the pixels in the image, the standard deviation of the luminance of the pixels, and the distances between luminance peaks in the luminance histogram are evaluated to determine whether a digital image is an ill-exposed image.

Other prior art devices identify backlit images as ill-exposed images based on an analysis of the shape of a luminance histogram. A backlit image typically has some image areas that are overexposed and other image areas that are underexposed. Such prior art devices identify an image as an ill-exposed image if the luminance histogram is determined to have an inverse bell shape or two or more peaks. Yet another prior art device classifies an image as overexposed, underexposed, or normal based on an evaluation of the width, the center and the centroid of a luminance histogram of the image.

Prior art devices that identify ill-exposed images based on an evaluation of luminance histograms are typically unable to accurately evaluate whether predominantly black areas and predominantly white areas of an image are ill-exposed. For example, such prior art devices are typically unable to distinguish between an appropriately exposed predominantly black area of an image and an underexposed or overexposed predominantly black area of an image. Such prior art devices are also typically unable to distinguish between an appropriately exposed predominantly white area of an image and an underexposed or overexposed predominantly white area of an image.

Thus what is needed is a system and method of identifying ill-exposed images that seeks to overcome one or more of the challenges and/or obstacles described above.

SUMMARY OF THE INVENTION

One aspect of the invention provides a method of identifying an ill-exposed image. The method includes receiving an image comprising a first image block, assessing luminance data associated with the first image block, assessing texture energy data associated with the first image block, and determining whether the image is ill-exposed based on the assessment of the luminance data and the assessment of the texture energy data associated with the first image block. Another aspect of the invention provides a machine readable medium for storing a machine executable program for identifying an ill-exposed image. Yet another aspect of the invention provides a system for identifying an ill-exposed image.

The foregoing and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

The present invention is illustrated by way of example and not limited in scope to the accompanying figures, in which like reference numerals indicate similar elements, and in which.

DETAILED DESCRIPTION OF THE PREFERRED EMBODIMENTS

Figure 1:
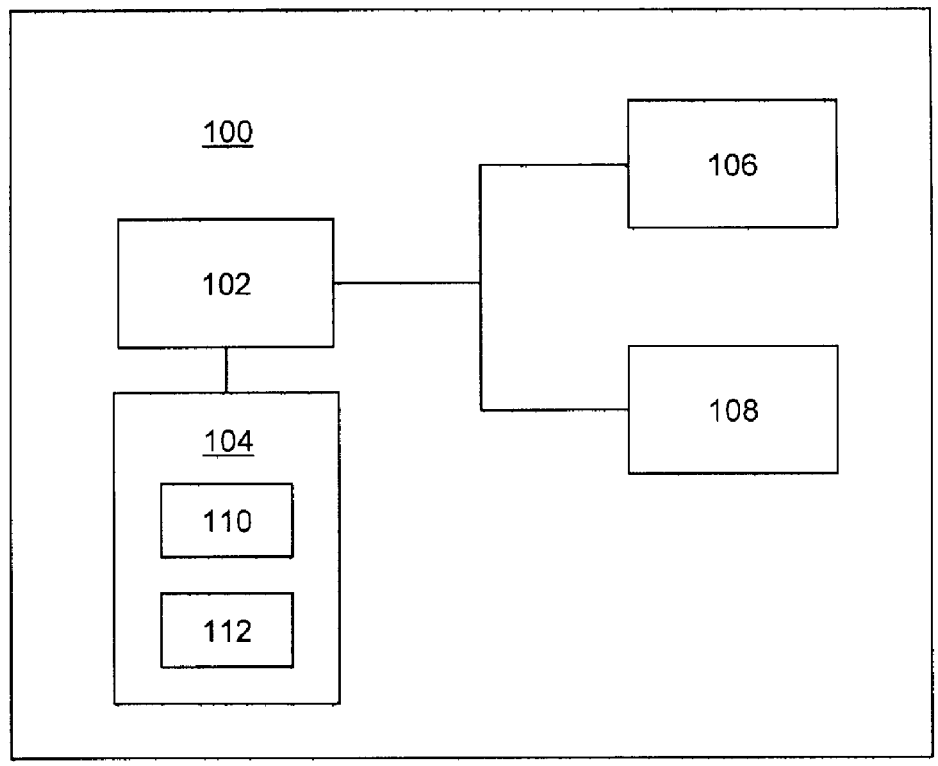
FIG. 1 is a block diagram of a system that may be used to implement one embodiment of identifying an ill-exposed image in accordance with the principles of the present invention.

Referring to FIG. 1, a block diagram of a system 100 that may be used to implement one embodiment of identifying an ill-exposed image in accordance with the principles of the present invention is shown. Examples of devices that may include the system 100 include, but are not limited to, a personal computer, a personal digital assistant (PDA), a digital camera, a photo printer system, and a cellular telephone. In one embodiment, the system 100 generally includes a controller 102 is communicatively coupled to a memory 104 and an input device 106. In another embodiment, the controller is also communicatively coupled to an output device 108. The controller 102 generally retrieves and executes machine readable instructions or software programs that are stored in the memory 104.

The memory 104 generally includes an operating system module 110 and an ill-exposed image identification module 112. The memory 104 may include additional application modules that may facilitate the operation of the system 100 and/or image processing functions. The memory 104 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disk drives, digital versatile disk drives, and flash memory devices.

The controller 102 is communicatively coupled to one or more input devices 106. Examples of input devices 106 include, but are not limited to, a scanner, a memory storage device reader, a keyboard, and a mouse. In one embodiment, one or more input/output interfaces are provided to enable data transfer between the controller 102 and one or more of a digital camera, a cellular telephone, a personal assistant device (PDA), or any other device that may operate as a source of images. In one embodiment, the controller 102 is communicatively coupled to one or more output devices 108. Examples of output devices 108 include, but are not limited to, a display screen and a printer.

Figure 2:
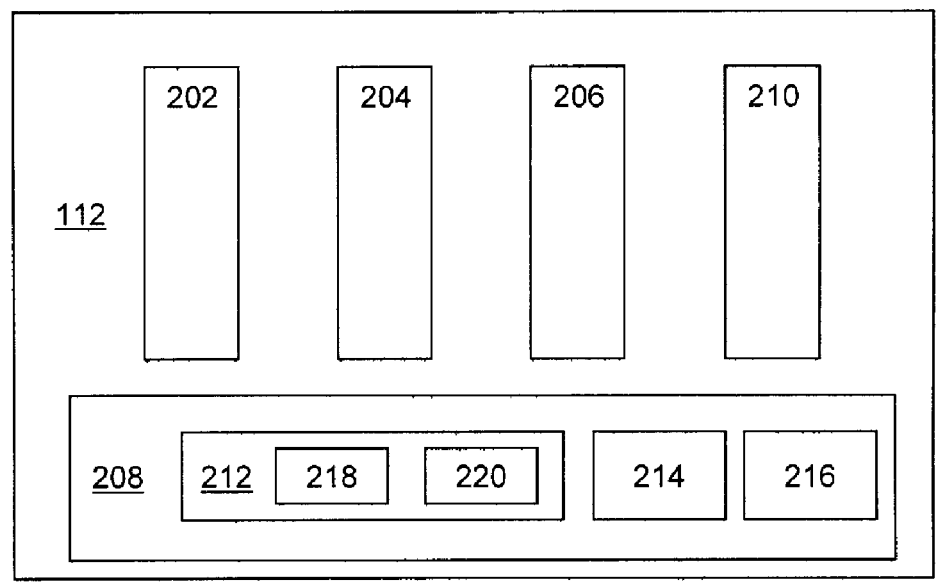
FIG. 2 is a block diagram of one embodiment of an ill-exposed image identification module in accordance with the principles of the present invention.

Referring to FIG. 2, a block diagram of one embodiment of an ill-exposed image identification module 112 in accordance with the principles of the present invention is shown. The ill-exposed image identification module 112 determines whether an image that is received for processing is an ill-exposed image. In one embodiment an ill-exposed image is an image where one or more selected areas of the image are determined to be bright or overexposed. A bright or overexposed area of an image is an area of an image that is typically perceived as excessively bright. In another embodiment, an ill-exposed image is an image where one or more selected areas of the image are determined to be dark or underexposed. A dark or underexposed area of an image is an area of an image that is typically perceived as excessively dark. In another embodiment, an ill-exposed image is an image where one or more selected areas of the image are determined to be bright or overexposed and one or more selected areas of the image are determined to be dark or underexposed.

In one embodiment, all images that are identified by the ill-exposed image identification module 112 as bright/overexposed, as dark/underexposed or as a combination of bright/overexposed and dark/underexposed are identified as ill-exposed images. In another embodiment, the ill-exposed image identification module 112 distinguishes between the different types of ill-exposed images. More specifically, the ill-exposed image identification module 112 identifies a bright/overexposed image as an overexposed ill-exposed image, a dark/underexposed image as an underexposed ill-exposed image and a combination bright/overexposed and dark/underexposed image as a combination overexposed/underexposed ill-exposed image.

In one embodiment, the ill-exposed image identification module 112 generally includes an image downsampler 202, an image area selector 204, an image block divider 206, an image block assessor 208 and an image assessor 210. In another embodiment of the ill-exposed image identification module 112 generally includes an image downsampler 202, an image block divider 206, an image block assessor 208 and an image assessor 210. In another embodiment of the ill-exposed image identification module 112 generally includes an image area selector 204, an image block divider 206, an image block assessor 208, and an image assessor. In another embodiment of the ill-exposed image identification module 112 generally includes an image block divider 206, an image block assessor 208, and an image assessor 210.

In one embodiment, the image downsampler 202, the image area sector 204, the image block divider 206, the image block assessor 208 and an image assessor 210 are all included within single device. In another embodiment, the image downsampler 202, the image area selector 204, the image block divider 206, the image block assessor 208 and the image assessor 210 are distributed over one or more communicatively coupled devices.

The image downsampler 202 receives an image for processing and generates a downsampled version of the received image. The size of the image received for processing may vary depending on the source of the image. In one embodiment, the image downsampler 202 generates a thumbnail representation of the received image.

The image area selector 204 receives the downsampled image and identifies one or more selected areas of the downsampled image for analysis. In one embodiment, the image area selector 204 selects the entire area of the downsampled image for analysis. In another embodiment, the image area selector 204 selects a generally centered area of the downsampled image for analysis such that the outer perimeter of the downsampled image is not considered in the evaluation of the image.

The image block divider 206 receives the selected image area and divides the selected image area into a plurality of image blocks. In one embodiment, the plurality of image blocks are non-overlapping image blocks. In another embodiment, the plurality of image blocks are overlapping image blocks. In one embodiment, the number of blocks that the image is divided into is based on the proportions of the selected image area. In one embodiment, the size of the individual image blocks is based on the proportions of the selected image area. In one embodiment the plurality of image blocks are uniform size image blocks. In one embodiment, the entire selected image area is analyzed as a single image block. It should be noted that while the image blocks may have a generally square or rectangular shape, image blocks having alternative shapes are also considered to be within the scope of the invention.

The image block assessor 208 evaluates each of the plurality of image blocks individually to determine the number of image blocks that fulfill the conditions necessary to be classified as bright image blocks and the number image blocks that fulfill the conditions necessary to be classified as dark image blocks. A bright image block is an image block that is typically perceived as an excessively bright image block and a dark image block is an image block that is typically perceived as an excessively dark image block. The image block assessor 208 generally includes a luminance assessor 212, a texture energy assessor 214 and an image block type counter 216. The luminance assessor 212 analyzes each of the plurality of image blocks and generates an assessment of the luminance of each of the plurality of image blocks. The texture energy assessor 214 analyzes each of the plurality of image blocks and generates an assessment of the texture energy of each of the plurality of image blocks. The image block type counter 216 determines whether each of the plurality of image blocks is a bright image block, a dark image block or a normal image block based on an analysis of the luminance data and the texture energy data provided by the luminance assessor 212 and the texture energy assessor 214, respectively. The image block type counter 216 determines the number of image blocks that have been identified as bright image blocks and the number of image blocks that have been identified as dark image blocks.

The luminance assessor 212 generally includes a luminance ratio assessor 218 and an average luminance assessor

220. The luminance ratio assessor 218 processes each of the plurality of image blocks individually to determine whether each image block fulfils a first bright image block condition for being identified as a bright image block or a first dark image block condition for being identified as a dark image block.

In order to determine whether an image block fulfils the first bright image block condition, the luminance ratio assessor 218 compares the luminance of each of the pixels in an image block to a pre-defined bright pixel threshold. If the luminance of a pixel is greater than the pre-defined bright pixel threshold, the pixel is identified as a bright pixel. For example, images with an 8-bit color depth typically have pixel luminance values that range from 0 to 255. In one embodiment, a pre-defined bright pixel threshold value of approximately 245 is used. It should be noted however, that the use of other pre-defined bright pixel threshold values are also considered to be within the scope of the invention.

The luminance ratio assessor 218 determines the total number of bright pixels in the image block and calculates a bright pixel ratio of the total number of bright pixels in the image block to the total number of pixels in the image block. The luminance ratio assessor 218 compares the bright pixel ratio to a pre-defined bright pixel ratio threshold. If the bright pixel ratio is greater than the pre-defined bright pixel ratio threshold, the first bright block condition is fulfilled indicating that the image block may be a bright image block. In one embodiment, a pre-defined bright pixel ratio threshold value of approximately 0.5 is used. It should be noted however, that the use of other pre-defined bright pixel ratio threshold values are also considered to be within the scope of the invention.

In order to determine whether an image block fulfils the first dark image block condition, the luminance ratio assessor 218 compares the luminance of each of the pixels in an image block to a pre-defined dark pixel threshold. If the luminance of a pixel is less than the pre-defined dark pixel threshold, the pixel is identified as a dark pixel. In one embodiment, a pre-defined dark pixel threshold value of approximately 6 is used. It should be noted however, that the use of other pre-defined dark pixel threshold values are also considered to be within the scope of the invention.

The luminance ratio assessor 218 determines the total number of dark pixels in the image block and calculates a dark pixel ratio of the total number of dark pixels in the image block to the total number of pixels in the image block. The luminance ratio assessor 218 compares the dark pixel ratio to a pre-defined dark pixel ratio threshold. If the dark pixel ratio is greater than the pre-defined dark pixel ratio threshold, the first dark block condition is fulfilled indicating that the image block may be a dark image block. In one embodiment, a pre-defined dark pixel ratio threshold value of approximately 0.7 is used. It should be noted however, that the use of other pre-defined dark pixel ratio threshold values are also considered to be within the scope of the invention. In one embodiment, a pixel luminance is determined based on the RGB data associated with that pixel. In anther embodiment, a pixel luminance is determined based on luminance data associated with that pixel that is available from decompressed image values.

The average luminance assessor 220 processes each of the plurality of image blocks individually to determine whether each image block fulfils a second bright image block condition for being identified as a bright image block or a second dark image block condition for being identified as a dark image block. In order to determine whether an image block fulfils the second bright image block condition, the average luminance assessor 220 determines the luminance of each of the pixels in an image block and calculates an average pixel luminance for that image block. The average luminance assessor 220 compares the average pixel luminance to a pre-defined average bright pixel luminance threshold. If the average pixel luminance is greater than the pre-defined average bright pixel luminance threshold, the second bright image block condition is fulfilled indicating that the image block may be a bright image block. In one embodiment, a pre-defined average bright pixel luminance threshold value of approximately 239 is used. It should be noted however, that the use of other pre-defined average bright pixel luminance threshold values are also considered to be within the scope of the invention.

In order to determine whether an image block fulfils the second dark image block condition, the average luminance assessor 220 compares the average pixel luminance to a pre-defined average dark pixel luminance threshold. If the average pixel luminance is less than the pre-defined average dark pixel luminance threshold, the second dark image block condition is fulfilled indicating that the image block may be a dark image block. In one embodiment, a pre-defined average dark pixel luminance threshold value of approximately 30 is used. It should be noted however, that the use of other pre-defined average dark pixel luminance threshold values are also considered to be within the scope of the invention.

The texture energy assessor 214 processes each of the plurality of image blocks individually to determine whether each image block fulfils a third bright image block condition for being identified as a bright image block or a third dark image block condition for being identified as a dark image block. The texture energy assessor 214 determines the edge energy and the variance of the luminance of the pixels for the image block. In one embodiment, the texture energy assessor 214 determines the edge energy using an edge detection filter. In one embodiment, the edge detection filter used is a Sobel filter. The texture energy assessor 214 generates the texture energy for the image block by dividing the edge energy by the variance.

In order to determine whether an image block fulfils the third bright image block condition, the texture energy assessor 214 compares the texture energy of the image block to a pre-defined bright texture energy threshold. If the texture energy is greater than the pre-defined bright texture energy threshold, the third bright image block condition is fulfilled indicating that the image block may be a bright image block. In one embodiment, a pre-defined bright texture energy threshold value of approximately 30 is used. It should be noted however, that the use of other pre-defined bright texture energy threshold values are also considered to be within the scope of the invention.

In order to determine whether an image block fulfils the third dark image block condition, the texture energy assessor 214 compares the texture energy of the image block to a pre-defined dark texture energy threshold. If the texture energy is greater than the pre-defined dark texture energy threshold, the third dark image block condition is fulfilled indicating that the image block may be a dark image block. In one embodiment, a pre-defined dark texture energy threshold value of approximately 35 is used. It should be noted however, that the use of other pre-defined dark texture energy threshold values are also considered to be within the scope of the invention. In one embodiment, the pre-defined bright texture energy threshold value is different from the pre-defined dark texture energy threshold value. In another embodiment, the pre-defined bright texture energy threshold value is approximately equal to the pre-defined dark texture energy threshold value.

The image block type counter 216 receives the luminance assessment data and the texture energy assessment data associated with each of the plurality of image blocks and determines whether each of the plurality of image blocks is a bright image block, a dark image block or a normal image block. The image block type counter 216 generates the number of image blocks that fulfill the conditions necessary to be classified as bright image blocks and the number of image blocks that fulfill the conditions necessary to be identified as dark image blocks.

In one embodiment, the first, second and third bright image block conditions have to be fulfilled for an image block to be classified as a bright image block and the first, second and third dark image block conditions have to be fulfilled for an image block to be classified as a dark image block. In another embodiment, the first and third bright image block conditions have to be fulfilled for an image block to be classified as a bright image block and the first and third dark image block conditions have to be fulfilled for an image block to be classified as a dark image block. In another embodiment, the second and third bright image block conditions have to be fulfilled for an image block to be classified as a bright image block and the second and third dark image block conditions have to be fulfilled for an image block to be classified as a dark image block.

The image block type counter 216 determines the number of image blocks of the plurality of image blocks that that fulfill the bright image block conditions thereby determining the number of bright image blocks in the selected area of the image. The image block type counter 216 determines the number of image blocks of the plurality of image blocks that that fulfill the dark image block conditions thereby determining the number of dark image blocks in the selected area of the image.

The image assessor 210 determines whether an image is an ill-exposed image or a well-exposed image. The image assessor 210 determines the total number of image blocks in the plurality of image blocks. The image assessor 210 generates a bright image block ratio and a dark image block ratio. The bright image block ratio is a ratio of the total number of bright blocks in the selected area of the image to the total number of image blocks in the selected area of the image. The dark image block ratio is a ratio of the total number of dark image blocks in the selected area of the image to the total number of image blocks in the selected area of the image.

The image assessor 210 compares the bright image block ratio to a pre-defined first bright image block ratio threshold. In one embodiment, if the bright image block ratio is greater than the pre-defined first bright image block ratio threshold, the image is identified as an ill-exposed image. In another embodiment, the ill-exposed image is specifically identified as a bright and/or overexposed ill-exposed image. In one embodiment, a pre-defined first bright image block ratio threshold value of approximately 0.4 is used. It should be noted however, that the use of other pre-defined first bright image block ratio threshold values are also considered to be within the scope of the invention.

The image assessor 210 compares the dark image block ratio to a pre-defined first dark image block ratio threshold. In one embodiment, if the dark image block ratio is greater than the pre-defined first dark image block ratio threshold, the image is identified as an ill-exposed image. In another embodiment, the ill-exposed image is specifically identified as a dark and/or underexposed ill-exposed image. In one embodiment, a pre-defined first dark image block ratio threshold value of approximately 0.4 is used. It should be noted however, that the use of other pre-defined first dark image block ratio threshold values are also considered to be within the scope of the invention.

The image assessor 210 compares the bright image block ratio to a pre-defined second bright image block ratio threshold and the dark image block ratio to a pre-defined second dark image block ratio threshold. If the image assessor 210 determines that the bright image block ratio is greater than the pre-defined second bright image block ratio threshold and the dark image block ratio is greater than the pre-defined second dark image block ratio threshold, the image is identified as an ill-exposed image. In another embodiment, the ill-exposed image is specifically identified as an ill-exposed combination bright/overexposed and dark/underexposed ill-exposed image.

In one embodiment, a pre-defined second bright image block ratio threshold value of approximately 0.25 and a pre-defined second dark image block ratio threshold value of approximately 0.25 are used. It should be noted however, that the use of other pre-defined second bright image block ratio thresholds and/or other pre-defined second dark image block ratio thresholds are also considered to be within the scope of the invention. In one embodiment, the pre-defined second bright image block ratio threshold is typically less than the pre-defined first bright image block ratio threshold and the pre-defined second dark image block ratio threshold is typically less than the pre-defined first dark image block ratio threshold.

In one embodiment, one of more of the pre-defined bright pixel threshold, the pre-defined bright pixel ratio threshold, the pre-defined dark pixel threshold, the pre-defined dark pixel ratio threshold, the pre-defined average bright pixel luminance threshold, the pre-defined average dark pixel luminance threshold, the pre-defined bright texture energy threshold, the pre-defined dark texture energy threshold, the pre-defined first bright image block ratio threshold, the pre-defined first dark image block ratio threshold, the pre-defined second bright image block ratio threshold, and the pre-defined second dark image block ratio threshold are defined via expert manual settings that are based on luminance and/or texture energy histogram analysis.

In another embodiment, one of more of the pre-defined bright pixel threshold, the pre-defined bright pixel ratio threshold, the pre-defined dark pixel threshold, the pre-defined dark pixel ratio threshold, the pre-defined average bright pixel luminance threshold, the pre-defined average dark pixel luminance threshold, the pre-defined bright texture energy threshold, the pre-defined dark texture energy threshold, the pre-defined first bright image block ratio threshold, the pre-defined first dark image block ratio threshold, the pre-defined second bright image block ratio threshold, and the pre-defined second dark image block ratio threshold are defined via a human expert training process. A human expert reviews a plurality of images that include normally exposed, overexposed, underexposed, and combination overexposed/underexposed images. The human expert reviews each of the plurality of images and provides perception based feedback regarding the different parameters associated with one or more of the threshold parameters. One or more of the thresholds are defined based on the feedback received from the human expert.

In another embodiment, one of more of the pre-defined bright pixel threshold, the pre-defined bright pixel ratio threshold, the pre-defined dark pixel threshold, the pre-defined dark pixel ratio threshold, the pre-defined average bright pixel luminance threshold, the pre-defined average dark pixel luminance threshold, the pre-defined bright texture energy threshold, the pre-defined dark texture energy threshold, the pre-defined first bright image block ratio threshold, the pre-defined first dark image block ratio threshold, the pre-defined second bright image block ratio threshold, and the pre-defined second dark image block ratio threshold can be redefined by a user via user provided feedback to the ill-lit image identification system. In the event, a user disagrees with the identification of an image as ill-exposed or normally exposed, the user can provide feedback to the ill-exposed image identification system requesting reclassification of the image. The ill-exposed image identification system reviews the user request and adjusts one or more of the threshold parameters to enable the classification of the image in accordance with the user provided feedback.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

Figure 3:
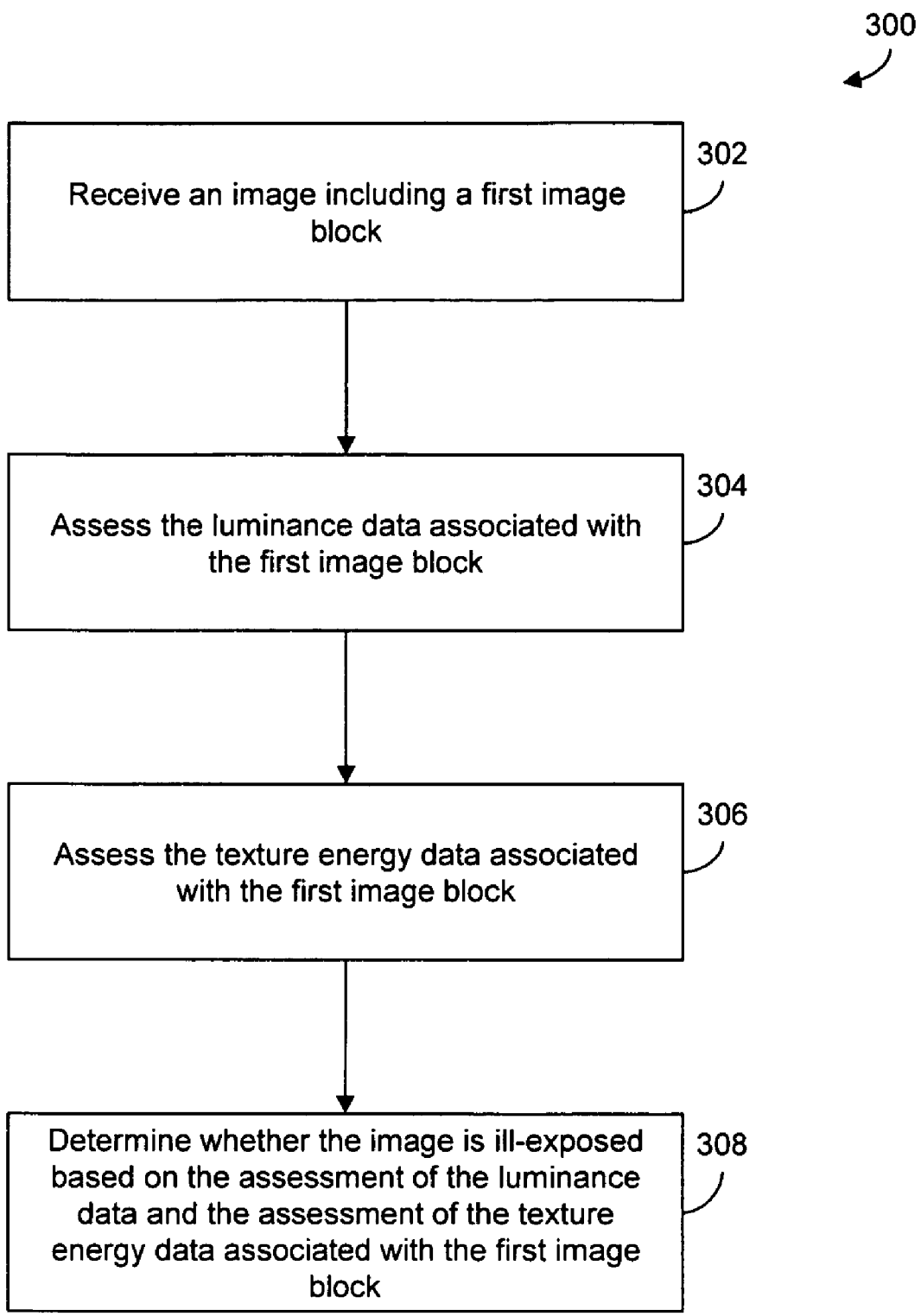
FIG. 3 is a flowchart of one embodiment of a method of identifying an ill-exposed image in accordance with the principles of the present invention.

Referring to FIG. 3, a flowchart of one embodiment of a method of identifying an ill-exposed image 300 in accordance with the principles of the present invention is shown. An image including a first image block is received at step 302. The luminance data associated with the first image block is assessed at step 304 and the texture energy data associated with the first image block is assessed at step 306. A determination is made regarding whether the image is ill-exposed based on the assessment of the luminance data and the assessment of the texture energy data associated with the first image block at step 308. It should be noted that while the steps in the method 300 have been described in a particular order, performing one or more of the steps in a different order are also considered to be within the scope of the invention.

In one embodiment, a machine readable medium stores a machine executable program for identifying an ill-exposed image. The machine readable medium includes machine readable code for receiving an image including a first image block, machine readable code for assessing the luminance data associated with the first image block, machine readable code for assessing the texture energy data associated with the first image block, and machine readable code for determining whether the image is ill-exposed image based on the assessment of the luminance data and the assessment of the texture energy data associated with the first image block.

In one embodiment, a system for identifying an ill-exposed image includes an input device 106 for receiving an image comprising a first image block, a luminance assessor 212 for assessing luminance data associated with the first image block, a texture energy assessor 214 for assessing texture energy data associated with the first image block, and an image assessor 210 for determining whether the image is ill-exposed based on the assessment of the luminance data and the assessment of the texture energy data associated with the first image block.

Figure 4A:
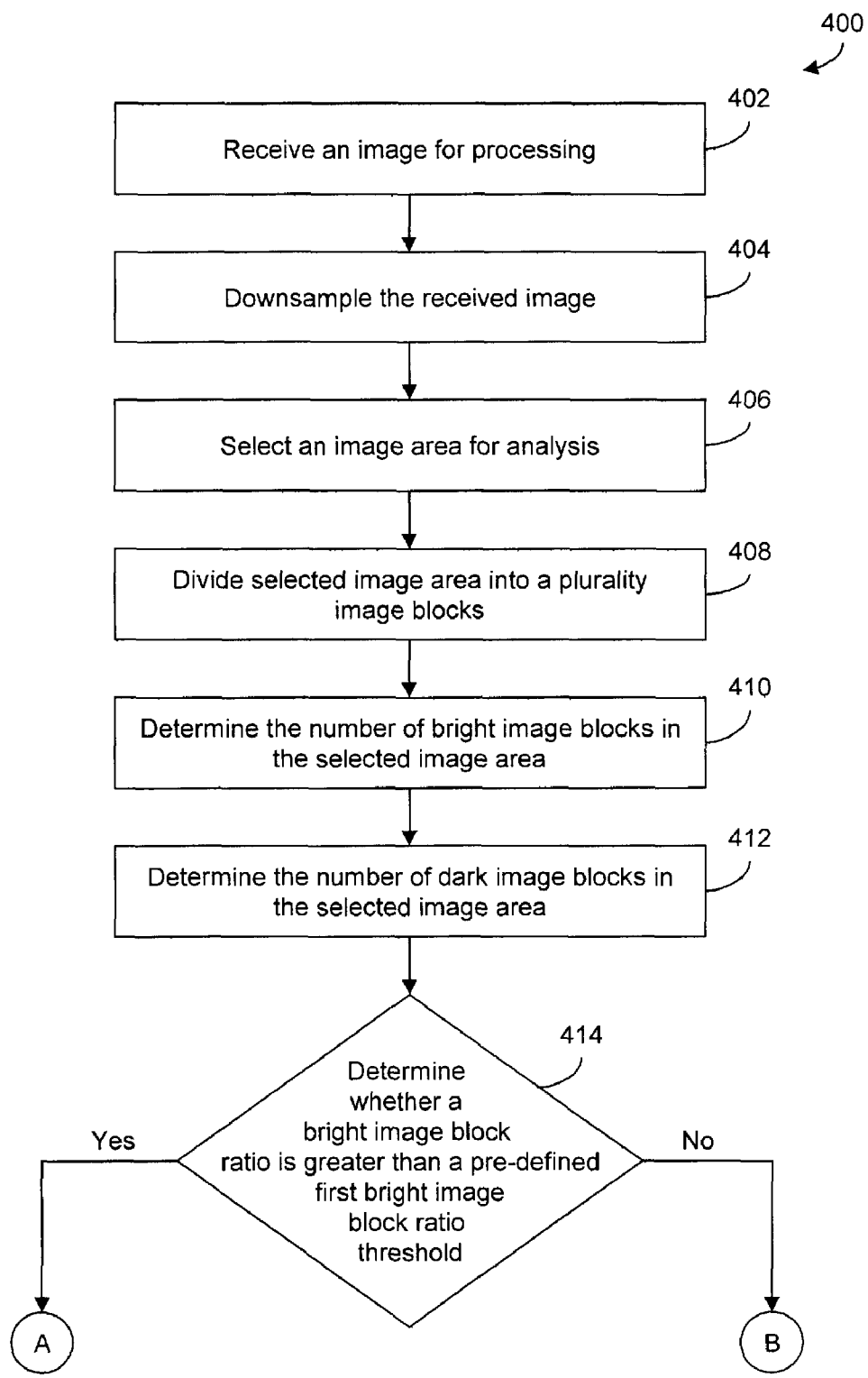
FIG. 4 is a flowchart of another embodiment of a method of identifying an ill-exposed image in accordance with the principles of the present invention.
Figure 4B:
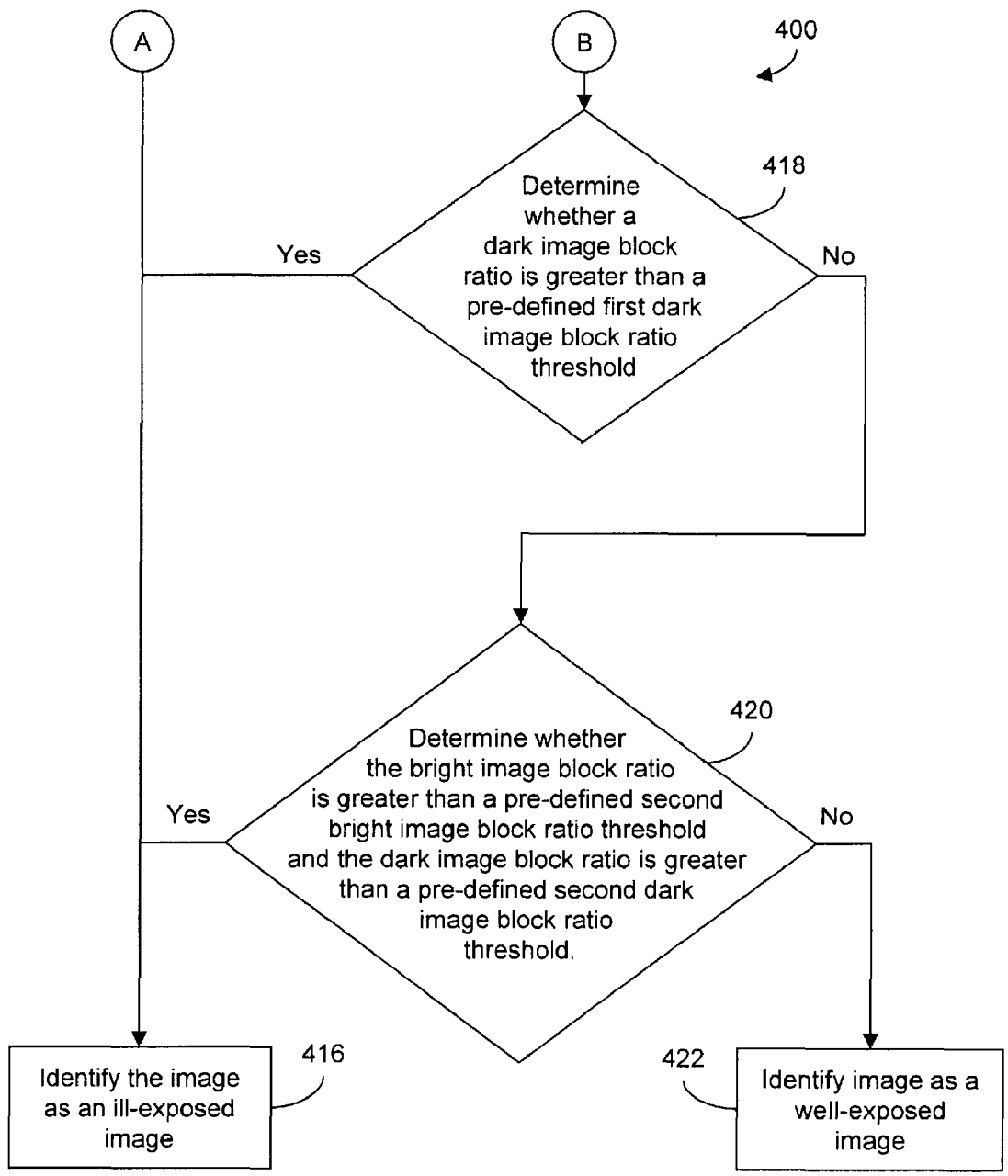

Referring to FIG. 4a-b, a flowchart of one embodiment of a method 400 of identifying an ill-exposed image in accordance with the principles of the present invention is shown. The method 400 begins at step 402 with receiving an image for processing. The image downsampler 202 downsamples the received image at step 404. The image area selector 204 selects one or more relevant areas of the received image for analysis at step 406. For example, the image area selector 204 may determine that the areas of the image along the outer perimeter of the image are not necessary for effective image analysis and may select the central portion of the image for analysis.

The image block divider 206 divides the selected area of the image into a plurality of image blocks at step 408. The image block assessor 208 evaluates each of the plurality of image blocks to determine the number of bright image blocks in the selected image area at step 410. The image block assessor 208 evaluates each of the plurality of image blocks to determine the number of dark image blocks in the selected image area at step 412.

At step 414, the image assessor 210 determines whether a bright image block ratio of the number of bright image blocks in the selected image area to the total number of image blocks in selected image area is greater than a first bright image block ratio threshold. If the bright image block ratio is greater than the first bright image block ratio threshold, the image is identified as an ill-exposed image at step 416. If the bright image block ratio is not greater than the first bright image block ratio threshold, the method proceeds to step 418.

At step 418, the image assessor 210 determines whether a dark image block ratio of the number of dark image blocks in the selected image area to the total number of image blocks in the selected image area is greater than a first dark image block ratio threshold. If the dark image block ratio is greater than the first dark image block ratio threshold, the image is identified as an ill-exposed image at step 416. If the dark image block ratio is not greater than the first dark image block ratio threshold, the method proceeds to step 420.

At step 420, the image assessor 210 determines whether the bright image block ratio is greater than a second bright image block ratio threshold and whether the dark image block ratio is greater than a second dark image block ratio threshold. If the bright image block ratio is greater than the second bright image block ratio threshold and the dark image block ratio is greater than the second dark image block ratio threshold, the image is identified as ill-exposed at step 416. If bright image block ratio is not greater than the second bright image block ratio threshold and the dark image block ratio is not greater than the second dark image block ratio threshold, the image is identified as well-exposed at step 422. It should be noted that while the steps in the method 400 have been described in a particular order, performing one or more of the steps in a different order are also considered to be within the scope of the invention.

As mentioned previously, the image block assessor 208 evaluates each of the plurality of image blocks to determine the number of bright image blocks in the selected image area (step 410 of method 400). More specifically, in one embodiment, the image block assessor 208 determines the number of image blocks of the plurality of image blocks that that fulfill the first, second and third bright image block conditions thereby determining the number of bright image blocks in the selected area of the image.

Figure 5:
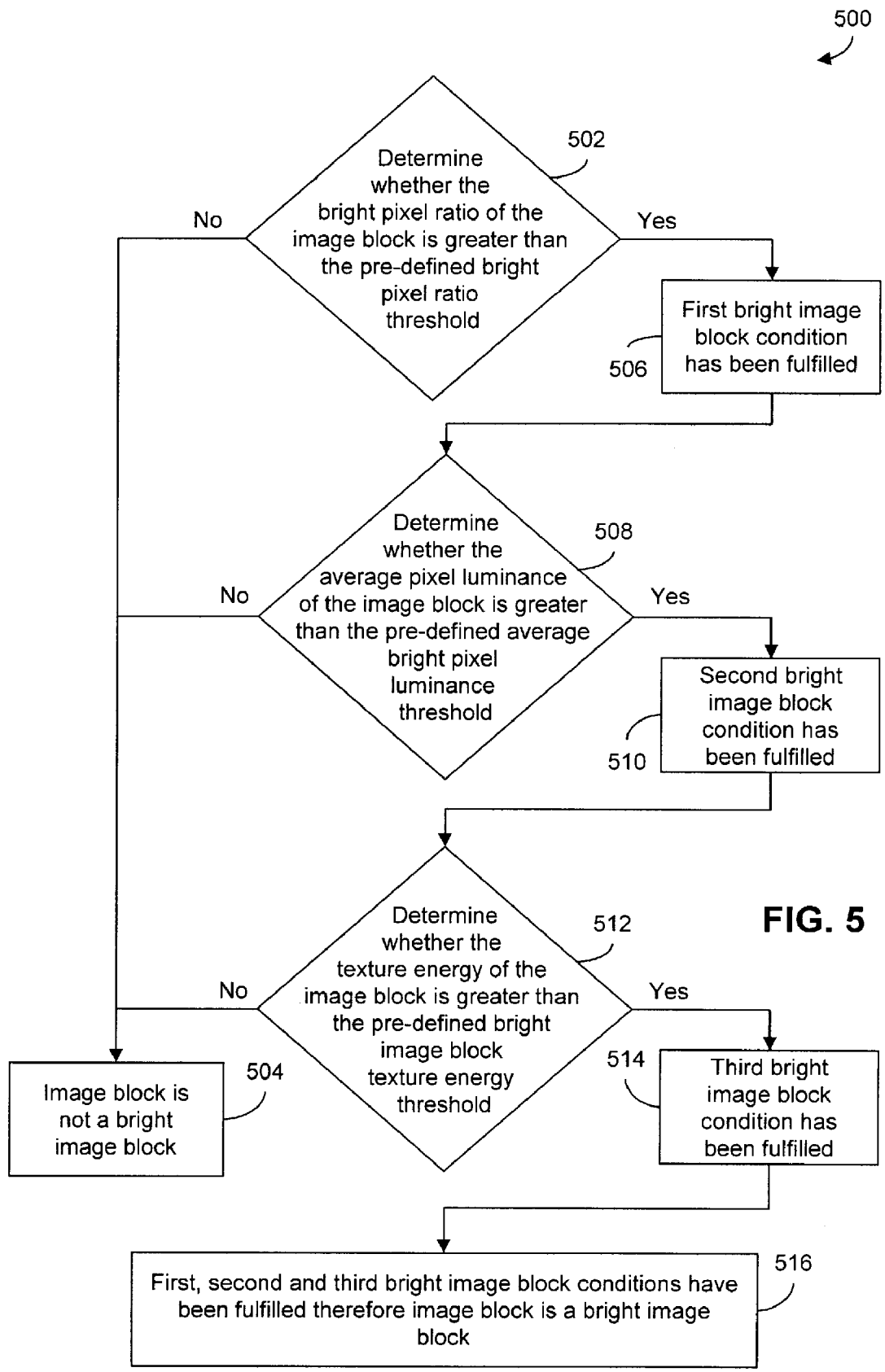
FIG. 5 is a flowchart of one embodiment of a method of determining whether an image block is a bright image block in accordance with the principles of the present invention.

Referring to FIG. 5, a flowchart of one embodiment of a method 500 of determining whether an image block is a bright image block in accordance with the principles of the present invention is shown. The method 500 begins at step 502 with the luminance ratio assessor 212 determining whether the bright pixel ratio of the image block is greater than the bright pixel ratio threshold. The bright pixel ratio is the ratio of the total number of bright pixels in the image block to the total number of pixels in the image block. If the bright pixel ratio is not greater than the bright pixel ratio threshold, the first bright image block condition is unfulfilled and the image block cannot be a bright image block at step 504. If the bright pixel ratio is greater than the bright pixel ratio threshold, the first bright image block condition is fulfilled at step 506.

At step 508, the average luminance assessor 220 determines whether the average pixel luminance of the pixels in the image block is greater than the average bright pixel luminance threshold. If the average pixel luminance is not greater than the average bright pixel luminance threshold, the second bright image block condition is unfulfilled and the image block cannot be a bright image block at step 504. If the average pixel luminance is greater than the average bright pixel luminance threshold, the second bright image block condition is fulfilled at step 510.

At step 512, the texture energy assessor 214 determines whether the texture energy of the image block is greater than the bright texture energy threshold. If the texture energy of the image block is less than the bright texture energy threshold, the third bright image block condition is unfulfilled and the image block cannot be a bright image block at step 504. If the texture energy of the image block is greater than the bright texture energy threshold, the third bright image block condition is fulfilled at step 514. Since the first, second and third bright image block conditions have been fulfilled, the image block is identified as a bright image block at step 516. It should be noted that while the steps in the method 500 have been described in a particular order, performing one or more of the steps in a different order are also considered to be within the scope of the invention.

As mentioned previously, the image block assessor 208 evaluates each of the plurality of image blocks to determine the number of dark image blocks in the selected image area (step 412 of method 400). More specifically, in one embodiment, the image block assessor 208 determines the number of image blocks of the plurality of image blocks that that fulfill the first, second and third dark image block conditions thereby determining the number of dark image blocks in the selected area of the image.

Figure 6:
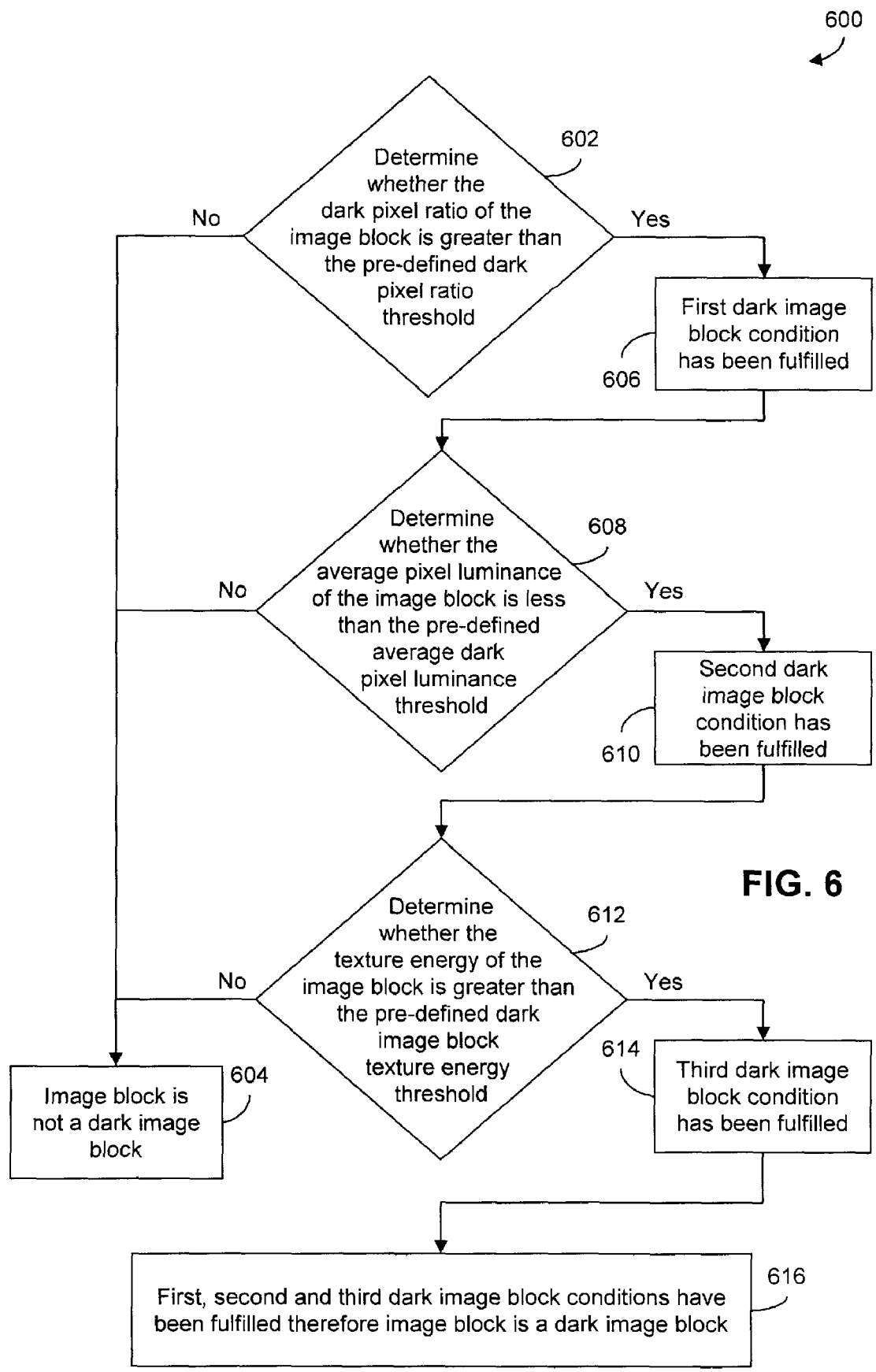
FIG. 6 is a flowchart of one embodiment of a method of determining whether an image block is a dark image block in accordance with the principles of the present invention.

Referring to FIG. 6, a flowchart of one embodiment of a method 600 of determining whether an image block is a dark image block in accordance with the principles of the present invention is shown. The method 600 begins at step 602 with the luminance ratio assessor 212 determining whether the dark pixel ratio of the image block is greater than the dark pixel ratio threshold. The dark pixel ratio is the ratio of the total number of dark pixels in the image block to the total number of pixels in the image block. If the dark pixel ratio is not greater than the dark pixel ratio threshold, the first dark image block condition is unfulfilled and the image block cannot be a dark image block at step 604. If the dark pixel ratio is greater than the dark pixel ratio threshold, the first dark image block condition is fulfilled at step 606.

At step 608, the average luminance assessor 220 determines whether the average pixel luminance of the pixels in the image block is less than the average dark pixel luminance threshold. If the average pixel luminance is not less than the average dark pixel luminance threshold, the second dark image block condition is unfulfilled and the image block cannot be a dark image block at step 604. If the average pixel luminance is less than the average dark pixel luminance threshold, the second dark image block condition is fulfilled at step 610.

At step 612, the texture energy assessor 214 determines whether the texture energy of the image block is greater than the dark texture energy threshold. If the texture energy of the image block is less than the dark texture energy threshold, the third dark image block condition is unfulfilled and the image block cannot be a dark image block at step 604. If the texture energy of the image block is greater than the dark texture energy threshold, the third dark image block condition is fulfilled at step 614. Since the first, second and third dark image block conditions have been fulfilled, the image block is identified as a dark image block at step 616. It should be noted that while the steps in the method 600 have been described in a particular order, performing one or more of the steps in a different order are also considered to be within the scope of the invention.

While the embodiments of the invention disclosed herein are presently considered to be preferred, various changes, and modifications can be made without departing from the spirit and scope of the invention. The scope of the invention is indicated in the appended claims, and all changes that come within the meaning and range of equivalents are intended to be embraced therein.

What is claimed is:

1. A method of identifying an ill-exposed image, comprising:
   receiving, by a processor, an image comprising a first image block;
   assessing, by the processor, luminance data associated with the first image block;
   assessing, by the processor, texture energy data associated with the first image block; and
   determining, by the processor, whether the image is ill-exposed based on the assessment of the luminance data and the assessment of the texture energy data associated with the first image block,
   wherein assessing texture energy data associated with the first image block comprises:
      determining an edge energy of the first image block;
      determining a variance of luminance of pixels in the first image block; and
      generating texture energy data for the first image block by dividing the edge energy by the variance.

2. The method of claim 1, further comprising downsampling the received image.

3. The method of claim 1, wherein the image comprises a plurality of image blocks including the first image block, and the method further comprises:
   assessing luminance data associated with each of the plurality of image blocks;
   assessing texture energy data associated with each of the plurality of image blocks; and
   determining whether the image is ill-exposed based on the assessment of the luminance data and the assessment of the texture energy data associated with each of the plurality of image blocks.

4. The method of claim 3, wherein receiving an image comprising a plurality of image blocks comprises receiving an image comprising a plurality of non-overlapping image blocks.

5. The method of claim 1, wherein assessing luminance data associated with the first image block comprises:
   determining whether a bright pixel ratio of the first image block is greater than a bright pixel ratio threshold; and
   determining whether a dark pixel ratio of the first image block is greater than a dark pixel ratio threshold.

6. The method of claim 1, wherein assessing luminance data associated with the first image block comprises:
   determining whether an average pixel luminance of the first image block is greater than an average bright pixel luminance threshold; and
   determining whether the average pixel luminance of the first image block is less than an average dark pixel luminance threshold.

7. A method of identifying an ill-exposed image, comprising:
- receiving, by a processor, an image comprising a plurality of image blocks including a first image block, the image blocks being non-overlapping;
- assessing, by the processor, luminance data associated with the first image block;
- assessing, by the processor, texture energy data associated with the first image block;
- determining, by the processor, whether the image is ill-exposed based on the assessment of the luminance data and the assessment of the texture energy data associated with the first image block;
- assessing, by the processor, luminance data associated with each of the plurality of image blocks;
- assessing, by the processor, texture energy data associated with each of the plurality of image blocks; and
- determining, by the processor, whether the image is ill-exposed based on the assessment of the luminance data and the assessment of the texture energy data associated with each of the plurality of image blocks, comprising:
  - determining a first ratio of a number of bright image blocks to a number of image blocks in the plurality of image blocks;
  - determining a second ratio of a number of dark image blocks to the number of image blocks in the plurality of image blocks;
  - identifying the image as ill-exposed if the first ratio is greater than a first bright image block ratio threshold; and
  - identifying the image as ill-exposed if the second ratio is greater than a first dark image block ratio threshold.

8. The method of claim 7, further comprising identifying the image as ill-exposed if the first ratio is greater than a second bright image block ratio threshold and the second ratio is greater than a second dark image block ratio threshold.

9. The method of claim 7, wherein assessing texture energy data associated with the first image block comprises:
- determining whether the texture energy data is greater than a bright texture energy threshold; and
- determining whether the texture energy data is greater than a dark texture energy threshold.

10. A non-transitory machine readable medium for storing a machine executable program for identifying an ill-exposed image, comprising:
- machine readable code for receiving an image comprising a first image block;
- machine readable code for assessing luminance data associated with the first image block;
- machine readable code for assessing texture energy data associated with the first image block; and
- machine readable code for determining whether the image is ill-exposed based on the assessment of the luminance data and the assessment of the texture energy data associated with the first image block,
- wherein the machine readable code for assessing texture energy data associated with the first image block comprises:
  - machine readable code for determining an edge energy of the first image block;
  - machine readable code for determining a variance of pixel luminance of pixels in the first image block; and
  - machine readable code for generating texture energy data for the first image block by dividing the edge energy by the variance.

11. The machine readable medium of claim 10, further comprising machine readable code for downsampling the received image.

12. The machine readable medium of claim 10, wherein the image comprises a plurality of image blocks including the first image block, and the machine readable medium further comprises:
- machine readable code for assessing luminance data associated with each of the plurality of image blocks;
- machine readable code for assessing texture energy data associated with each of the plurality of image blocks; and
- machine readable code for determining whether the image is ill-exposed based on the assessment of the luminance data and the assessment of the texture energy data associated with each of the plurality of image blocks.

13. The machine readable medium of claim 12 wherein the machine readable code for determining whether the image is ill-exposed based on the assessment of the luminance data and the assessment of the texture energy data associated with each of the plurality of image blocks comprises:
- machine readable code for determining a first ratio of a number of bright image blocks to a number of image blocks in the plurality of image blocks;
- machine readable code for determining a second ratio of a number of dark image blocks to the number of image blocks in the plurality of image blocks;
- machine readable code for identifying the image as ill-exposed if the first ratio is greater than a first bright image block ratio threshold; and
- machine readable code for identifying the image as ill-exposed if the second ratio is greater than a first dark image block ratio threshold.

14. The machine readable medium of claim 13, further comprising machine readable code for identifying the image as ill-exposed if the first ratio is greater than a second bright image block ratio threshold and the second ratio is greater than a second dark image block ratio threshold.

15. The machine readable medium of claim 10, wherein assessing luminance data associated with the first image block comprises:
- machine readable code for determining whether a bright pixel ratio of the first image block is greater than a bright pixel ratio threshold; and
- machine readable code for determining whether a dark pixel ratio of the first image block is greater than a dark pixel ratio threshold.

16. The machine readable medium of claim 10, wherein the machine readable code for assessing luminance data associated with the first image block comprises:
- machine readable code for determining whether an average pixel luminance of the first image block is greater than an average bright pixel luminance threshold; and
- machine readable code for determining whether the average pixel luminance of the first image block is less than an average dark pixel luminance threshold.

* * * * *